United States Patent [19]

Hackett

[11] Patent Number: 5,279,748
[45] Date of Patent: Jan. 18, 1994

[54] POOL FILTER WITH ELECTROLYTIC ACTION

[76] Inventor: Richard Hackett, 4502 W. Walnut, Rogers, Ark. 72756

[21] Appl. No.: 936,509

[22] Filed: Aug. 28, 1992

[51] Int. Cl.$^5$ .............................. C02F 1/50; C02F 1/70; C02F 1/72
[52] U.S. Cl. ................................ 210/757; 210/758; 210/763; 210/764; 210/765; 210/202; 210/206; 210/282; 210/266; 210/169
[58] Field of Search ............... 210/202, 206, 282, 266, 210/209, 764, 758, 763, 169, 757, 765

[56] References Cited

U.S. PATENT DOCUMENTS

| | | | |
|---|---|---|---|
| 3,152,077 | 10/1964 | Kryzer | 210/288 |
| 3,178,024 | 4/1965 | Jacuzzi | 210/288 |
| 3,474,817 | 10/1969 | Bates et al. | 210/169 |
| 3,540,592 | 11/1970 | Derremaux | 210/169 |
| 3,842,870 | 10/1974 | Burgess | 210/444 |
| 3,950,251 | 4/1976 | Hiller | 210/287 |
| 4,416,854 | 11/1983 | Nielsen | 204/148 |
| 4,584,106 | 4/1986 | Held | 210/206 |
| 4,610,783 | 9/1986 | Hudson | 210/169 |
| 4,642,192 | 2/1987 | Heskett | 210/757 |
| 4,752,401 | 6/1988 | Bodenstein | 210/192 |
| 4,773,998 | 9/1988 | Heinrich | 210/288 |
| 4,936,979 | 6/1990 | Brown | 210/169 |
| 4,986,906 | 1/1991 | Dadisman | 210/169 |
| 5,008,011 | 4/1991 | Underwood | 210/232 |
| 5,017,286 | 5/1991 | Heiligman | 210/266 |
| 5,092,993 | 3/1992 | Goodwin | 210/209 |
| 5,118,655 | 6/1992 | Pedersen | 210/679 |
| 5,135,654 | 8/1992 | Heskett | 210/763 |
| 5,149,437 | 9/1992 | Wilkinson et al. | 210/282 |
| 5,152,464 | 10/1992 | Farley | 210/449 |

Primary Examiner—Stanley S. Silverman
Assistant Examiner—Cynthia L. Nessler
Attorney, Agent, or Firm—Robert R. Keegan; Daniel R. Alexander

[57] ABSTRACT

A filtering system with electrolytic action and method is disclosed which is adapted for filtering the water in swimming pools, spas, saunas, hot tubs, whirlpools and the like. The filtering system includes a pump for drawing water from a body of water and circulating this water through an electrolytic filter including a layer of electrolytic filter media of dissimilar metal particles or granules and returning this filtered water to the body of water. The filtering system not only removes sand and sediment but also prevents algae and fungus growth, kills bacteria, and eliminates the need for adding chlorine, bromine, and algacide to the water. In accordance with a preferred embodiment, the filtering system includes a bypass valve installed downstream of the pump to divert only a selected quantity of water through the electrolytic filter. The filtering system may include a conventional backwashing filter unit upstream of the electrolytic filter to prolong the useful life of the electrolytic filter media and to eliminate the need for backwashing of the electrolytic filter.

17 Claims, 3 Drawing Sheets

5,279,748

POOL FILTER WITH ELECTROLYTIC ACTION

BACKGROUND OF THE INVENTION

The present invention is directed to water filtering systems and methods, and more particularly, concerns a filtering system with electrolytic action and method which is adapted for use with swimming pools, spas, saunas, hot tubs, whirlpools and the like.

Conventional swimming pool filtering systems include a pump for drawing water from the pool and circulating this water through a pool filter or tank containing particulate filter media, such as sand or diatomaceous earth, and returning this filtered pool water to the swimming pool. Such a system is useful in separating out solid particles from the pool water. In order to eliminate bacteria, fungus and algae from the pool water and filter media and to adjust the pH, pool maintenance chemicals including chlorine, bromine, algaecide, muriatic acid, bicarbonate of soda and soda ash are added to the pool water. The particulate filter media is rejuvenated or cleansed by backflushing the pool filter so as to remove collected sediments and solids from the filter media. In order to keep the pool water properly treated with chemicals, it is necessary to regularly test the water and periodically add additional chemicals to the water.

Such conventional methods of maintaining a swimming pool are undesirable because of the dollar cost of the pool maintenance chemicals and the time involved in monitoring and adding chemicals to the pool. For example, the average cost of chemicals for properly maintaining a family size swimming pool per month is over $50.00. Also, conventional methods for maintaining a proper chemical level in the typical swimming pool involve some element of danger or health hazard in that the chemicals, especially in the concentrated form, are either toxic or hazardous and must be dispensed carefully so as to prevent injury and must be kept away from children and pets.

It is to be understood that conventional hot tub, spa, sauna, whirlpool and the like filtering systems and methods are substantially the same as the above-described conventional swimming pool filtering systems and methods except that the pumps and filters are smaller in size and fewer chemicals need to be added due to the smaller amount of water to be filtered. However, these conventional filtering systems also suffer from the drawbacks of dollar cost, waste of time, and exposure to hazardous or toxic chemicals.

Hence, there is a need for an improved swimming pool, hot tub, spa, sauna, whirlpool and the like filtering system and method which not only removes sand and sediment but also kills algae, fungus, and bacteria without requiring the use of chlorine, bromine, or algaecide.

SUMMARY OF THE INVENTION

In accordance with the present invention, the above-mentioned drawbacks of conventional swimming pool, hot tub, spa, sauna, whirlpool and the like filtering systems and methods are addressed by a filter with electrolytic action and method which can be used either in conjunction with or in place of conventional filter units, and which eliminates the need for chlorine, bromine, and algaecide as maintenance chemicals. In accordance with an exemplary embodiment of the present invention, a pool filtering system with electrolytic action includes at least a pump and an electrolytic filter unit. The pump draws water from a swimming pool and circulates this water through the electrolytic filter unit and back to the swimming pool. A bypass valve is installed downstream of the pump to divert only a selected quantity of pool water through the electrolytic filter unit. The filter unit includes a lower layer of gravel or large sized particulate matter, and an upper layer of 10–100 mesh copper-zinc particles which serve as the electrolytic filter media.

The principle object of the present invention is the provision of an improved filter with electrolytic action for use with swimming pools, spas, hot tubs, whirlpools and the like. Another object of the present invention is the provision of an electrolytic filter which can be used in conjunction with a conventional backwashing filter, or which can be used instead of a conventional backwashing filter, and which eliminates the need for chlorine, bromine, and algaecide. A still further object of the present invention is the provision of a filter system with electrolytic action which not only removes sand and sediment but also prevents algae and fungus growth and kills bacteria. Yet another object of the present invention is the provision of a low maintenance pool filtering system which eliminates the need for chlorine, bromine, and algaecide type pool maintenance chemicals.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
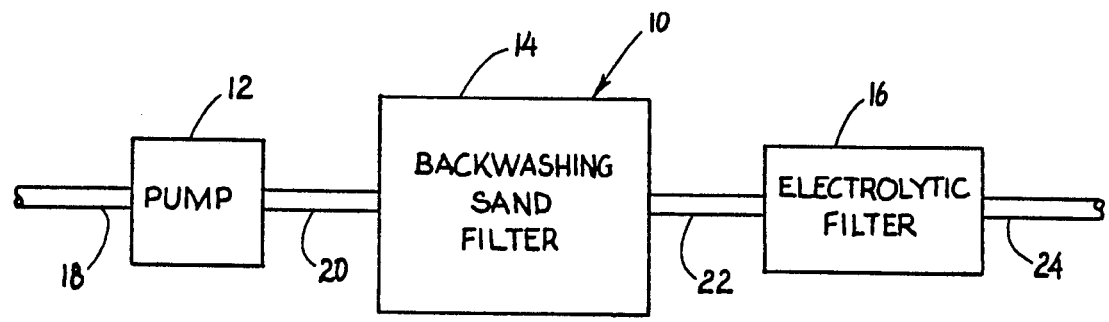
FIG. 1 is a schematic block diagram illustration of a filtering system in accordance with one embodiment of the present invention.

In accordance with one embodiment of the present invention as shown in FIG. 1 of the drawings, a filter system for filtering the water in swimming pools, hot tubs, spas, etc. is generally designated by the reference numeral 10 and shown to include as major components a fluid pump 12, a backwashing sand filter 14, and an electrolytic filter 16. The pump 12 and sand filter 14 are conventional items found in a typical pool filtering system. The pump 12 draws water from the body of water (pool, hot tub, spa and the like) along a drain line, conduit, or pipe 18. For example, drain line 18 is connected to a drain at the bottom of a pool and to a skimmer assembly at the side of the pool. Pump 12 supplies the drawn water under pressure along a conduit 20 to the backwashing sand filter 14 wherein the pumped water is filtered through a particulate filter media, such as sand or diatomaceous earth, in order to remove solid particles and sediments from the water. Typically, once the water has passed through the sand filter 14 it is returned to the body of water (pool, hot tub, spa and the like) via a return line. However, in accordance with the present invention, the electrolytic filter 16 has been added downstream of the sand filter 14 so as to provide a second filtering of the water. After the water has passed though sand filter 14, it passes along a conduit 22 to electrolytic filter 16, circulates through the electrolytic filter 16, and is returned to the body of water via a return line 24. In accordance with a particular example of a filter system 10 for use with a swimming pool, the lines 18, 20, 22, and 24 are one and one-half inch diameter PVC tubing and fittings which are typically used in swimming pool applications.

In accordance with the exemplary embodiment shown in FIG. 1 of the drawings, the pump 12 serves to circulate water through both the sand filter 14 and electrolytic filter 16. Since the electrolytic filter 16 is located downstream of the sand filter 14, the sand filter provides a first stage of filtering and removes solid particles, sediment, and dirt from the water. Next, the electrolytic filter 16, as described in more detail with reference to FIGS. 3, 4 and 5 of the drawings, includes a layer or bed of electrolytic filter media of dissimilar metal particles or granules, for example copper-zinc alloy particles ranging in size from 10 to 100 mesh (U.S. standard mesh). In accordance with a preferred embodiment of the present invention, the electrolytic granules or filter media is a copper-zinc filter media marketed under the product designation ZINC-COPPER KDF 55-D by KBF Systems of Constantine, Mich., and described, for example, in U.S. Pat. No. 4,642,192. The electrolytic filter 16 provides a second stage of filtering and removes sand, sediment, and particles down to 40 microns, kills bacteria, algae and fungus, and prevents the growth of bacteria, algae, and fungus in the body of water. Since the sand filter 14 traps the sediment, sand, dirt, and solid particles during the first stage of filtering, the service life of the electrolytic filter 16 is prolonged and it need not be backflushed. The sand filter 14 is backflushed or backwashed periodically to remove sediments from the particulate filter media.

The electrolytic filter media within the electrolytic filter 16 eliminates the need for conventional pool maintenance chemicals, such as chlorine, bromine, and algaecide, inasmuch as the electrolytic filter media of dissimilar metal particles produces a catalytic action and redox (reduction/oxidation) reactions when subjected to water containing dissolved oxygen, minerals, and organic materials. Within each dissimilar metal particle or granule, one metal becomes the cathode and the other becomes the anode. The space between the granules within the bed of filter media becomes electrolytic cells and the water and its mineral contaminants passing therethrough act as electrolytes. As water passes through the electrolytic granules, a chemical reaction causes metal hydroxides to form in controlled amounts. These controlled releases of oxides are carried into the filtered water where they kill bacteria and provide a hostile environment for algae and fungus growth. Further, the electrolytic granules remove chlorine by altering the chemical composition of chlorine into oxides and harmless salts.

Figure 2:
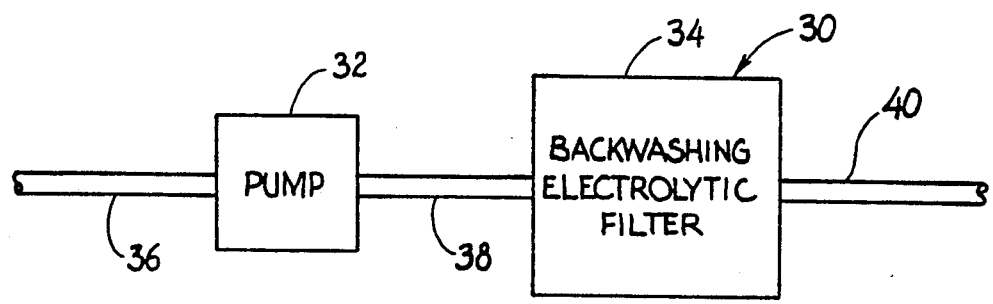
FIG. 2 is a schematic block diagram representation of a filtering system in accordance with another embodiment of the present invention.

In accordance with an alternative embodiment of the present invention as shown in FIG. 2 of the drawings, a water filtering system for use with swimming pools, hot tubs, spas, saunas, whirlpools and the like is generally designated by the reference numeral 30 and shown to include as major components a pump 32 and a backwashing electrolytic filter 34. Pump 32 is a conventional pump used in pool filtering systems and draws water from the body of water of the swimming pool, hot tub, etc. along a drain line 36 and forces this water under pressure to the electrolytic filter 34 along a line 38. Once the water passes through the electrolytic filter 34, it is returned to the body of water via a return line 40. In accordance with a particular example of a filter system 30 for use with a swimming pool, the lines 36, 38, and 40 are one and one-half inch diameter PVC tubing and fittings which are typically used in swimming pool applications.

The filtering system 30 of FIG. 2 differs from the filtering system 10 of FIG. 1 in that it is a single stage filtering system with the backwashing electrolytic filter 34 being the sole filter means for filtering the water and providing for the removal of sand, sediment, dirt, and solid particles down to 40 microns, removal of chlorine, killing of bacteria, algae, and fungus, and providing a hostile environment for bacteria, algae, and fungus growth. The backwashing electrolytic filter 34 is larger in size than the electrolytic filter 16 and provides for backflushing or backwashing of the electrolytic filter media therein for removing trapped sand, sediment, and solid particles.

As will be described below in more detail with respect to FIGS. 3 through 5 of the drawings, each of the electrolytic filters 16 and 34 of the systems 10 and 30 of FIGS. 1 and 2 respectively may include a bypass valve for selecting the flow rate or quantity of water which is passed through the filter and allowing the remaining water to return directly to the body of water (pool, hot tub, etc.) without being electrolytically filtered. The output of pumps 12 and 32 may be greater than the flow rate at which the electrolytic filters 16 and 34 operate at peak performance. Thus, a bypass valve used in association with each of the electrolytic filters 16 and 34 provides for an on site adjustment of flow rate so as to optimize the filtering effect of the electrolytic filters. The copper content of the water can be controlled by increasing or decreasing the flow rate through the electrolytic filter. Hence, the bypass valve serves to accommodate variations in the size of the pumps, diameters of fluid conduits, and condition of the water to be filtered.

Algae growth is one of the main problems in surface waters used for swimming pools, hot tubs, whirlpools, etc. Low residual zinc and copper ions released into the water from a zinc-copper type electrolytic filter media prevent algae and fungus growth. After removing dirt and sediment, most filtration media, such as carbon, sand, or cartridge filters, become ideal environments for bacteria growth. The copper-zinc filter media used in accordance with the present invention is bacteriostatic and bacteria reductions of up to 95% have been recorded where water is filtered through the copper-zinc media. It is believed that the copper-zinc filter media will remain active for a long period of time. Corrosive index tables on the loss of zinc and copper indicate several years of active life is possible before replacement is necessary. Since there are no pores to plug up in the copper-zinc filter media and it is not soft like carbon, it can be effectively backwashed for many years. Frequent backwashing will increase media effectiveness and extend media life.

Figure 3:
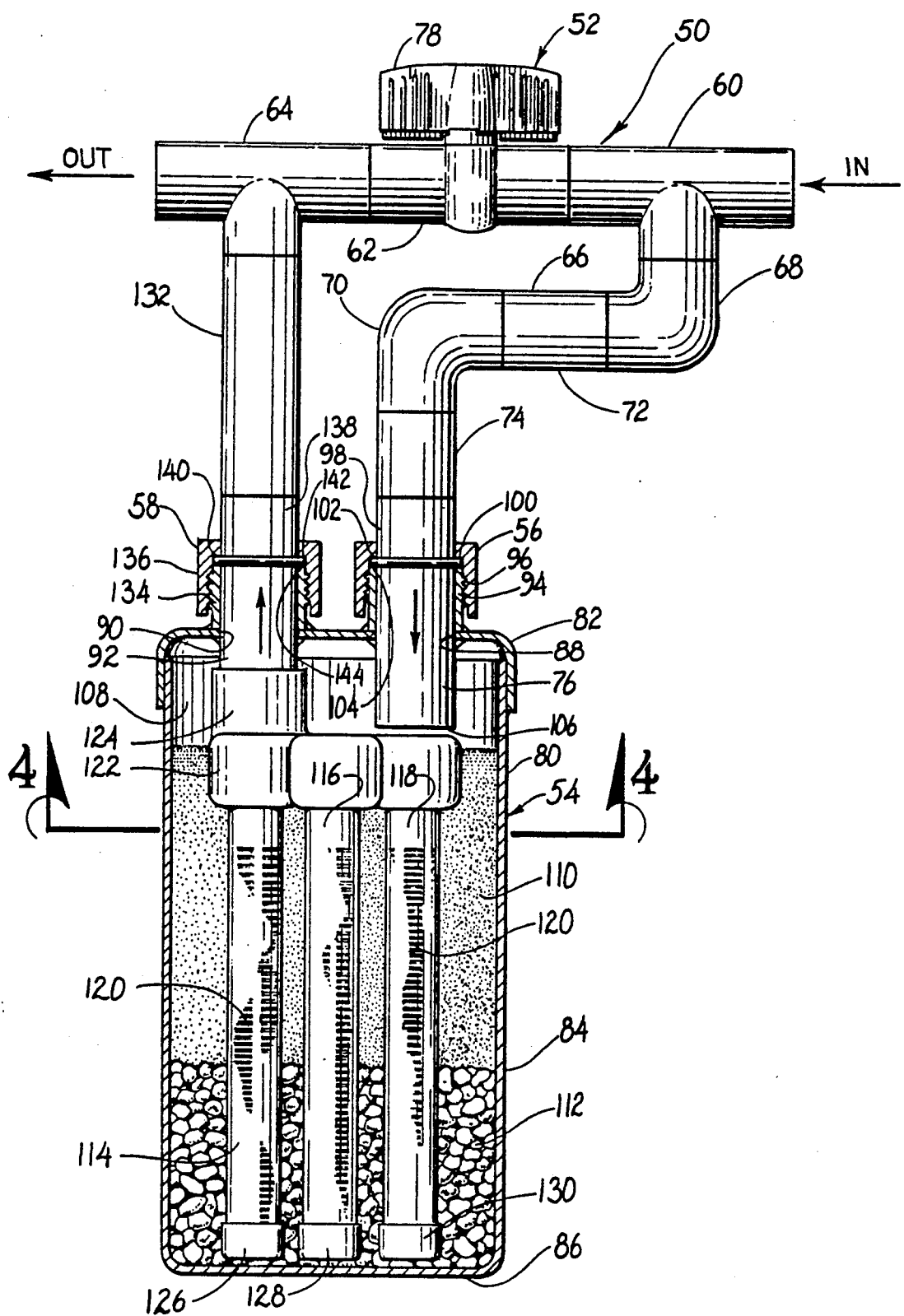
FIG. 3 is a front plan view and partial cross-section illustration of an electrolytic filter unit in accordance with an exemplary embodiment of the present invention.
Figure 4:
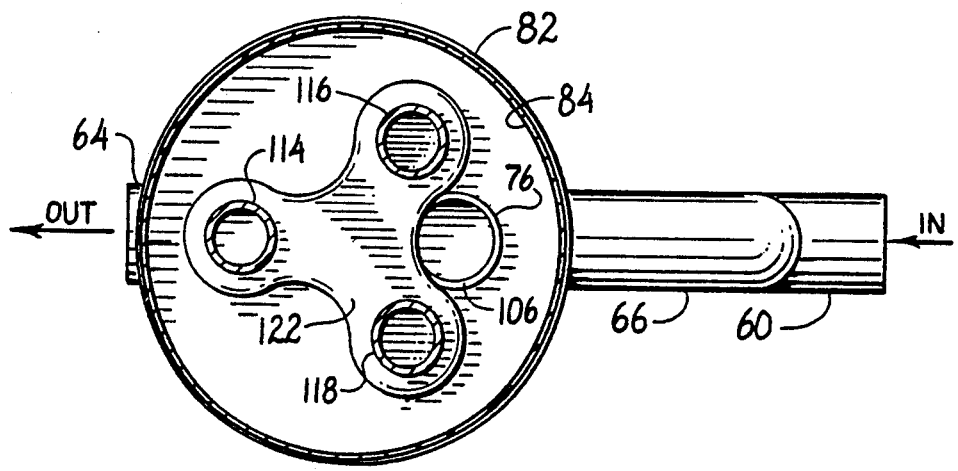
FIG. 4 is a sectional view taken along line 4—4 in FIG. 3.
Figure 5:
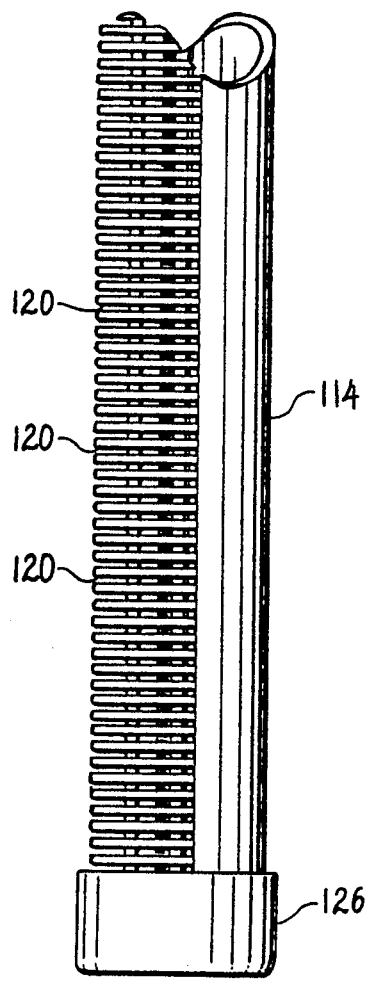
FIG. 5 is an enlarged detail view representation of one of the vented extraction tubes of FIG. 3.

In accordance with a particular embodiment of the present invention as shown in FIGS. 3 through 5 of the drawings, an electrolytic filter unit, generally designated by the reference numeral 50, is shown to include a bypass valve arrangement 52 and an electrolytic filter 54 joined together by inlet and outlet quick disconnect couplings 56 and 58. Electrolytic filter unit 50 receives incoming water to be filtered as shown by the arrow labeled "I" either directly from a pump or sand or cartridge filter at a first T fitting 60. The incoming water "I" either passes through a ball valve 62 to a second T fitting 64 and is returned directly to the body of water (pool, spa, hot tub, etc.) without being electrolytically filtered or is diverted in T fitting 60 and flows through an inlet conduit 66 to the electrolytic filter 54. Inlet conduit 66 includes first and second elbow fittings 68 and 70 and first and second sections of straight tubing 72 and 74 and is connected to a water inlet 76 of electrolytic filter 54 by quick coupling 56. The fittings and conduits shown in FIG. 3 are, for example, one and one-half inch diameter conventional PVC pipe or tubing commonly used in association with swimming pools, hot tubs, etc. The ball valve 62 is, for example, a one and one-half inch commercially available PVC solvent ball valve and has a handle 78 which is rotated right or left, clockwise or counterclockwise, so as to adjust the flow rate of water through the electrolytic filter and that which bypasses the filter and is returned directly to the body of water.

Electrolytic filter 54 includes a filter housing 80 having a slip cap 82, a cylindrical body 84, and a circular base 86. Slip cap 82 includes first and second circular openings 88 and 90 dimensioned so as to receive the water inlet 76 and a water outlet 92. The water inlet 76 and outlet 92 are short lengths of one and one-half inch diameter PVC pipe sealed to the slip cap 82 by conventional PVC hot glue, solvent or cement so as to provide a watertight seal between the inlet, outlet, and slip cap.

Quick coupling 56 includes an externally threaded annular body 94, an internally threaded cap 96, and a flanged fitting 98. Annular body 94 is sealed and attached to water inlet 76 and attached to slip cap 82. Flanged fitting 98 has an annular flange 100 extending circumferentially at its base with the flange 100 including an annular recess for receiving an O-ring which provides a fluid tight seal between the flanged fitting 98 and the coupling body 94. When cap 96 is threaded onto body 94, a shoulder 102 of cap 96 is brought down against the upper surface of flange 100 so as to force the O-ring and lower surface of the flange 100 against an upper surface 104 of the coupling body 94. Quick coupling 56 is a conventional PVC quick coupling which provides a fluid tight seal between two lengths of PVC tubing and allows for quick and easy attachment and detachment of one relative to the other.

Water inlet 76 receives incoming water from conduit 66 and has an open base 106 which allows the incoming water to fill an open interior space 108 in the upper portion of the housing 80. Below the space 108 is a layer of electrolytic filter media 110, for example copper-zinc granules or particles ranging in size from 10 to 100 mesh, and a lower layer of gravel or large size granular material 112. The gravel holds the electrolytic filter media up to facilitate the flow of water through the electrolytic media before reaching one of a plurality of vented outlet tubes or laterals 114, 116, and 118. Each of the vented laterals 114, 116, and 118 is nested down in the electrolytic filter media layer 110 and gravel layer 112 in a substantially vertical orientation and spaced apart so that each vented lateral extracts water from a respective portion of the electrolytic filter media layer 110 and gravel layer 112.

As illustrated in FIGS. 3 and 4 of the drawings, each of the laterals 114, 116, and 118 includes a plurality of horizontal openings or vents 120 for ingress and egress of water into and out of the lateral. The vents 120 are sized so as to keep the electrolytic filter media particles or granules 110 and gravel 112 from entering the tubes 114, 116, and 118. The upper end of each of the laterals 114, 116, and 118 is attached to a respective opening in the lower surface of a triangular fitting 122. Fitting 122 has an upper cylindrical projection 124 which is attached to water outlet 92 and provides fluid communication between the laterals 114, 116, and 118 and water outlet 92. The lower end of each of the laterals 114, 116, and 118 is sealed with an end cap 126, 128, and 130 respectively.

As illustrated in more detail in FIG. 5 of the drawings, vented outlet tube 114 includes a plurality of horizontal vents or openings 120 which allow for the ingress and egress of water to and from the interior of the tube 114. The base of tube 114 is sealed with the end cap 126. Openings or vents 120 extend only partially through the tube 114 and are dimensioned so as to prevent particulate filter media and gravel from entering the tube 114. Although only tube 114 is shown in detail, it is to be understood that laterals 116 and 118 are of a similar construction.

Water outlet 92 of electrolytic filter 54 is connected to an output conduit 132 by quick coupling 58. Quick coupling 58 is the same as quick coupling 56 in that it includes an externally threaded coupling body 134, an internally threaded cap 136, and a flanged fitting 138. Threaded body 134 is attached to water outlet 92 and slip cap 82. Flanged fitting 138 has an annular flange 140 projecting from its base. Cap 136 has an internal shoulder 142 which is brought down against the upper surface of annular flange 140 of fitting 138 when cap 136 is threaded onto coupling body 134. Preferably, flange 140 of fitting 138 includes a recess in its lower surface for receiving an O-ring which provides a fluid tight seal between the flange 140 and the upper surface of coupling body 134.

Electrolytic filter 54 can be back-flushed or washed to remove sand, sediment and other trapped particles to rejuvenate the filter media 110 and gravel 112 by simply loosening quick couplings 56 and 58, rotating filter housing 80 about its longitudinal axis 180°, attaching quick coupling 56 to the water outlet 92 and quick coupling 58 to water inlet 76, and passing water through the filter 54.

In accordance with a particular example of the electrolytic filter unit 50 used in conjunction with a swimming pool, T-fittings 60 and 64 and inlet and outlet conduits 66 and 132 are one and one-half inch diameter PVC pipes or tubes, quick couplings 56 and 58 are PVC couplings for use with one and one-half inch diameter PVC pipes, electrolytic filter cap 82 is an eight inch diameter PVC slip cap, filter housing 84 is a twelve inch length of eight inch diameter PVC pipe and base 86 is an eight inch diameter PVC slip cap. The PVC components of the filter unit 50 are attached and sealed together using conventional PVC hot glue, cement, or solvent.

In accordance with another particular example of an electrolytic filter unit in accordance with the present invention and for use with a swimming pool, the conduits are all one and one-half inch diameter PVC pipes, the T-fittings, ball valve, and quick couplings are all PVC components designed for use with one and one-half inch diameter PVC pipe, the filter cap and base are twelve inch diameter PVC slip caps, the filter housing is a thirteen inch length of twelve inch diameter PVC pipe, and the filter includes eight laterals or vented outlet tubes which provide for a greater flow of water through the filter media. Also, a pressure gauge is added to the filter cap to monitor the fluid pressure within the filter and facilitate proper adjustment of the bypass valve to provide for the most effective filtering.

Thus, it will be appreciated, as a result of the present invention, a highly effective, improved pool filter with electrolytic action and method is provided by which the principal objective, among others is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed as my invention is:

1. Pool filter apparatus for recirculating, filtering and treating the water in swimming pools, spas, hot tubs and whirlpools comprising:
    fluid conduit means providing fluid communication between a pool and pump means, said pump means and filter means, and said filter means and the pool,
    said pump means for drawing water from the pool and circulating at least a portion of the drawn water through said filter means before it is returned to the pool,
    said filter means including an electrolytic filter having electrolytic matter, said electrolytic matter providing a means for removing chlorine and particles and for adding an agent to the drawn water which is circulated through said electrolytic filter for killing bacteria and preventing algae and fungus growth, and
    adjustable flow control valve means for controlling the amount of drawn water which passes through said electrolytic filter and for limiting the amount of said bacteria killing agent added to said drawn water,
whereby said apparatus provides for the effective filtering and treatment of the pool water while providing for limiting the electrolytic filtering thereof.

2. Apparatus as recited in claim 1 wherein said electrolytic filter includes a filter housing having a water inlet and a water outlet, and containing at least a layer of said electrolytic matter including copper-zinc particles ranging in size from 10-100 mesh for filtering and treating the drawn water as it flows from said inlet to said outlet.

3. Apparatus as recited in claim 1 wherein said filter means further includes a backwashing sand filter for removing solid particles, sand and sediment from the drawn water before it reaches said electrolytic filter and wherein said electrolytic filter is located downstream of said sand filter.

4. Apparatus as recited in claim 1 wherein said adjustable flow control valve means comprises a bypass valve for controlling the amount of drawn water which is passed through said electrolytic filter.

5. Apparatus as recited in claim 4 wherein said electrolytic filter housing further contains a layer of gravel located below said layer of electrolytic matter for facilitating fluid flow from said water inlet, through said electrolytic matter, and to said water outlet.

6. Apparatus as recited in claim 5 wherein said water outlet of said electrolytic filter housing includes a plurality of vented tubes for facilitating extraction of water from said layer of electrolytic matter.

7. Apparatus as recited in claim 6 wherein said water inlet and outlet of said electrolytic filter housing include quick disconnect couplings for facilitating removal and replacement of said electrolytic filter.

8. Apparatus as recited in claim 7 wherein each of said quick-disconnect couplings include an externally threaded body and an internally threaded cap.

9. In a recirculating-type pool water filtering system including a pool, a pump and filter for drawing water from the pool, and fluid conduits disposed between the pool and the pump, the pump and the filter and the filter and the pool, for circulating the drawn water through the filter and returning the filtered water to the pool, for use with swimming pools, hot tubs, spas, saunas, and whirlpools, the improvement comprising:
    an electrolytic filter unit located downstream of the filter and including an electrolytic filter media means for filtering out solid particles down to 40 microns, for removing chlorine and for adding an agent to at least a portion of the circulating drawn pool water for killing bacteria and preventing algae and fungus growth, and
    adjustable flow control valve means for controlling the amount of drawn pool water which passes through said electrolytic filter media to thereby control the amount of said bacteria killing agent added to said pool water.

10. The system as recited in claim 9 wherein said electrolytic filter media means comprises copper-zinc particles ranging in size from 10-100 mesh.

11. The system as recited in claim 9 wherein said adjustable flow control valve means comprises a bypass valve for controlling the flow rate of drawn pool water through said electrolytic filter media means.

12. In a method of filtering and maintaining water in swimming pools, spas, hot tubs and whirlpools including the steps of circulating the water through a sand type filter media and adding chlorine and algaecide to the water, the improvement comprising:
    circulating at least a portion of said sand filtered water through an electrolytic filter media to remove particles and chlorine and to replace the chlorine with an agent for killing bacteria and preventing algae and fungus growth, and
    controlling the amount of water which is circulated through said electrolytic filter media to extend the service life of the media and to limit the addition of said bacteria killing agent to an amount sufficient to properly maintain the water.

13. The method as recited in claim 12 wherein said electrolytic filter media is copper-zinc alloy particles ranging in size from about 10-100 mesh.

14. A method of filtering and treating the body of water in a swimming pool, spa, hot tub or whirlpool comprising the steps of:
    drawing water from the body of water,
    circulating at least a portion of said drawn water through an electrolytic filter media of dissimilar metals to remove chlorine and particles and to add an agent to kill bacteria and prevent algae and fungus growth, controlling the rate at which said drawn water is circulated through said electrolytic filter media to limit the amount of said bacteria killing agent added to said body of water, and returning said drawn water to said body of water, thereby eliminating the need for the use of conventional chlorine, bromine and algaecide pool maintenance products.

15. The method as recited in claim 14 wherein said electrolytic filter media comprises copper-zinc alloy particles ranging in size from about 10-100 mesh.

16. The method as recited in claim 15 further comprising the steps of:

circulating said drawn water through a sand type filter media prior to circulating at least a portion of said drawn water through said electrolytic filter media.

17. A method of filtering and maintaining the body of water in a swimming pool without the use of conventional pool maintenance products including chlorine, bromine and algaecide comprising the steps of:

drawing water from the body of water, circulating said drawn water through an electrolytic filter media of dissimilar metals to remove chlorine and particles and to add an agent to kill bacteria and prevent algae and fungus growth, controlling the rate at which said drawn water is circulated through said electrolytic filter media to limit the amount of said bacteria killing agent added to said drawn water, and returning said drawn and circulated water to said body of water.

* * * * *